April 21, 1959 A. N. TODOROFF 2,883,514
CONTROL SYSTEM FOR FABRICATING AND PROCESSING MACHINES
Filed Sept. 10, 1956 5 Sheets-Sheet 1
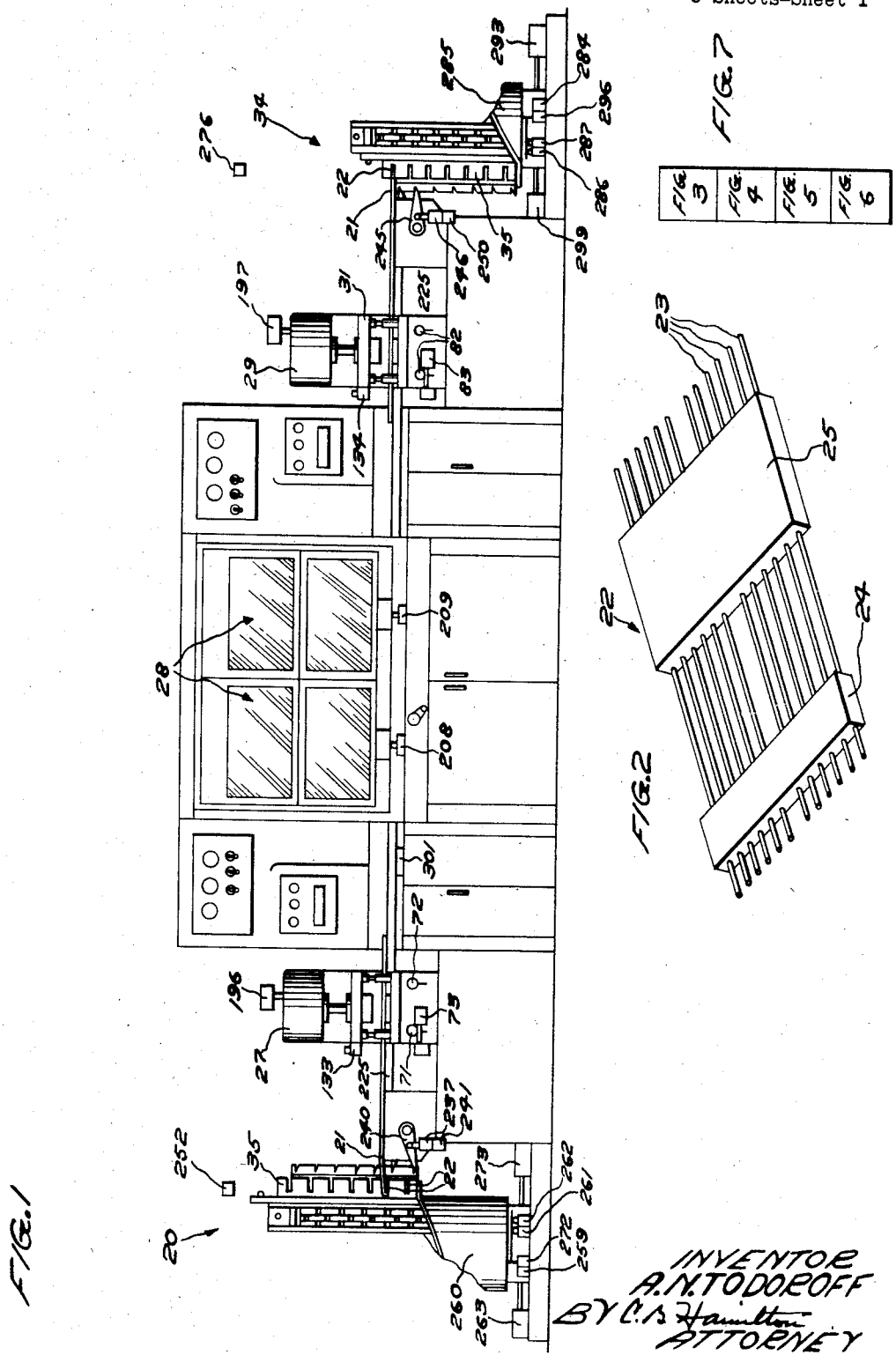

April 21, 1959 A. N. TODOROFF 2,883,514
CONTROL SYSTEM FOR FABRICATING AND PROCESSING MACHINES
Filed Sept. 10, 1956 5 Sheets-Sheet 5

INVENTOR
A.N.TODOROFF
BY C.N. Hamilton
ATTORNEY

United States Patent Office 2,883,514
Patented Apr. 21, 1959

2,883,514

CONTROL SYSTEM FOR FABRICATING AND PROCESSING MACHINES

Alexander N. Todoroff, Chicago, Ill., assignor to Western Electric Company, Incorporated, New York, N.Y., a corporation of New York Application September 10, 1956, Serial No. 608,855

10 Claims. (Cl. 219—79)

This invention relates to a control system for fabricating and processing machines, and more particularly to a system for advancing a part to be processed through a series of work stations wherein the proper functioning of each working machine at each station controls the subsequent operation of the system.

In the fabrication and processing of metal parts, it is desirable to provide an installation for automatically effectuating several succeeding work operations on each part. Where such an installation is employed, it is of critical importance that each fabricating or processing machine perform its designated function prior to the operation of the next succeeding machine on the part. Further, in the use of a complex installation, the failure of one machine to properly function results in the production of unacceptable parts. Hence, such an installation should include facilities for halting subsequent operations whenever a failure exists. Instrumentalities should be provided to indicate exactly where the failures occurred, and apprise an attendant in such a manner as to allow him to rapidly make the necessary repairs or adjustments.

In addition, the use of a complex fabricating installation involves the employment of many moving machines and dangerous electrical control circuits. Routine servicing of these installations during normal operation is usually performed by semi-skilled workers; thus, all precautions should be made to reduce the possibility of disabling accidents. When failures occur, the usual practice is for the semi-skilled worker to call upon the services of a skilled mechanic to make any necessary repairs or adjustments.

In the present invention, the disclosed apparatus is designed to perform three specific work functions on a part known as a wire spring relay comb, but it is to be readily understood from the following description that the invention is equally applicable to the fabrication of other parts. The comb consists of a plurality of laterally spaced wires held in position by a pair of phenolic blocks. Specifically the description will relate to the successive automatic operation of fabricating machines for effectuating (1) a trimming operation, (2) a welding operation and (3) an aligning operation.

It is a primary object of the invention to provide an automatic system for rapidly and economically performing several processing operations upon a single work piece.

Another object of the invention is to provide a control system that includes facilities for interrupting the further operation of the system upon failure of any component machine or instrumentality to perform its designated functions.

A further object of the invention contemplates a reliable and safe start control circuit for a fabricating system wherein each component is properly positioned and conditioned prior to the initiation of operation of the fabricating cycle.

An additional object of the invention resides in a control system for machines having facilities therein to preclude damage to any of the machines or injury to any of the attendants upon failure to any component to properly function.

With these and other objects in view, the present invention provides a feed mechanism for successively advancing a work piece from an indexible storage rack to a trimming machine, then to a welding machine, next to an aligning machine and finally to a second indexible storage rack.

The operating mechanisms and controls for the component are electrically interconnected to halt all operations upon any one of the components failing to properly operate. A vast system of checking circuits are provided to insure, that prior to operation, each machine is in proper condition and position to accomplish its function in the normal work cycle. This checking circuit also includes facilities for delaying operation of the system to permit certain critical components, such as electronic units, to be placed in a proper condition for operation prior to the initiation of the first work cycle.

All electrical components and all dangerous moving parts are encased in cabinets. A system of safety circuits are associated with the cabinets to preclude opening of the cabinets during the work cycle thereby eliminating possible injuries to attendants.

Other objects and advantages of the present invention will be apparent from the following detailed description when considered in conjunction with the accompanying drawings wherein:

Fig. 1 is a side elevational view of a series of machines that successively process or fabricate work parts in accordance with the principles of the invention;

Fig. 2 illustrates a typical work piece that is to be processed by the machines shown in Fig. 1;

Figure 3:
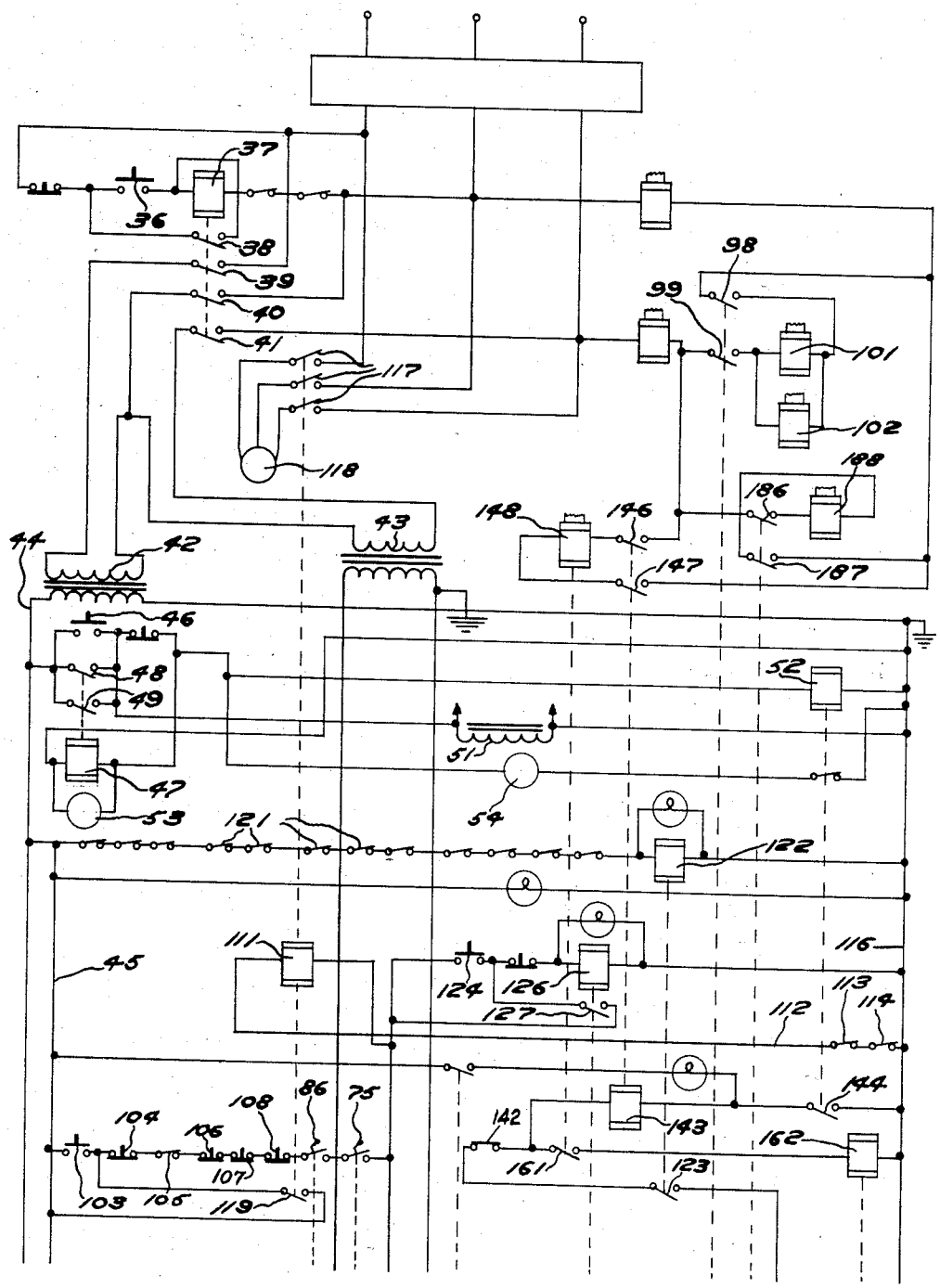

Figs. 3, 4, 5 and 6 when assembled in the manner depicted in Fig. 7 show a circuit for controlling the work cycle of the machines shown in Fig. 1.

Referring to Fig. 1, parts to be fabricated are stored in an indexed magazine device generally designated by the reference numeral 20. Such a device may be of the type shown in the copending application of E. W. Larsen et al., Serial No. 446,312, filed July 28, 1954. This indexed magazine device will function to successively advance work pieces to a position adjacent to a reciprocating feed mechanism 21 of the general type shown in the copending application of C. R. Rasmussen et al., Serial No. 465,276, filed October 28, 1954. This feed mechanism will reciprocate to successively advance the work pieces in a step-by-step fashion along a horizontal path.

The work piece used to illustrate the invention is a wire spring relay comb 22 (see Fig. 2) that comprises a plurality of laterally spaced wires 23 held in position by a pair of phenolic support blocks 24 and 25. It is desired to first trim the upper ends of the wires, then weld a small precious or semi-precious metal contact to the trimmed terminals of the wires and finally realign the lateral positioning of the individual wires.

These results are attained by actuating the feed mechanism to successively feed each part to a hydraulically operated trimmer 27. The trimmer is in the form of a standard hydraulic press and further description thereof is not deemed warranted for an understanding of the present invention. Next, each part is successively advanced to a welding machine 28 of the type shown in the patent to E. W. Larsen, No. 2,749,419, issued June 5, 1956.

The last fabricating operation is performed by a press 29 that is also hydraulically controlled and is of commercial manufacture. This press has a ram 31 having a first aligning die secured thereto for forcing the spring wires 23 into a second aligning die to restore a parallel relationship to the wires. Completed parts are advanced from the hydraulic press 29 to a second indexible storage device 34. This device is constructed in accordance with the instructions set forth in the heretofore identified Larsen et al. copending application.

Each of the indexing devices consists of a series of magazine racks 35 having a series of slots for receiving the combs. The lefthand indexing device 20 successively advances combs into position to be seized by the reciprocating feeding mechanism 21. The slots in the righthand magazine 35 are successively positioned to receive the fabricated combs from the reciprocating feed mechanism 21.

Control of the heretofore described components is obtained through the instrumentality of a control circuit shown in Figs. 3, 4, 5 and 6. Considering first that the system is at rest and that the lefthand magazine racks 35 are loaded with wire spring relay combs 22, then the attendant will first close a start switch 36 (Fig. 3) to energize a relay 37. Relay contact 38 pulls up to complete a locking circuit for the relay, and relay contacts 39, 40 and 41 pull up to complete energizing circuits for the primaries 42 and 43 of a pair of transformers. The transformer including the primary 43 is provided to supply a high voltage source for the welder 28. The function of the transformer 42 is to provide operating power to a bus lead 44.

Next the attendant will depress a filament start button 46 completing a circuit for energizing a relay 47. A pair of contacts 48 and 49 are thereupon drawn up to complete, respectively, a locking circuit for the relay 47 and an energizing circuit for a filament transformer 51. This transformer functions to provide filament current for a series of vacuum tubes in the control circuit of the welder shown in Fig. 6. Closure of the start button 46 also effectuates the energization of a time delay relay 52. This time delay relay 52 controls contacts in the circuit for controlling the initiation of a work cycle and a five minute time delay interval is required for its operation in order to provide sufficient time for the filaments in the electronic tubes to properly warm up. Indicating lamps 53 and 54 are provided to apprise the attendant that the start button 46 has been operated.

The attendant now depresses a push button 56 (Fig. 4) to energize a relay 57. Energization of relay 57 draws up a locking contact 58 and initiates the operation of a hydraulic pump motor (not shown) associated with the trimmer 27. The attendant then momentarily closes a push button 59 to effectuate the energization of a relay 61 which completes an obvious locking circuit through an associated contact 62. Energization of relay 61 also effectuates the initiation of a hydraulic pump motor (not shown) associated with the aligning press 29.

The attendant now depresses a push button 63 to complete an obvious circuit to a relay 64 which functions to draw up a locking contact 66. Operation of relay 64 also completes an operating circuit for an exhaust fan (not shown) contained in the cabinet of the welding machine 28.

Referring to Fig. 1, it will be noted that the trimmer 27 is provided with a pair of operating handles 71 and 72 for the purpose of permitting manual operation. With the operating handles 71 and 72 in the upper position, a plunger operated contact device 73 is operated. Closure of contactor 73 permits a pair of contacts 74 (Fig. 4) and 75 (Fig. 3) to close. Closure of contact 74 results in the energization of a relay 76 to open a contact 77 included in the circuit of a lamp 78. Extinguishment of the lamp 78 indicates to the operator that the trimmer 27 is not set up for manual operation. Energization of relay 76 also draws up a contact 79 to illuminate a lamp 80 that apprises the operator that the trimmer 27 is set up for automatic operation. Further energization of relay 76 closes a contact 81 to condition a control circuit for the operation of the trimmer 27.

Referring again to Fig. 1, it will be noted that the press 29 is also provided with a pair of manually operable control handles 82. Again a plunger-operated contactor device 83 is provided to hold the handles 82 in an "automatic" position. With the contact device 83 set as shown in Fig. 1, a pair of contacts 86 (Fig. 3) and 87 (Fig. 4) are in a closed position. Closure of contact 87 causes the energization of a relay 88 which draws up a series of contacts 89, 90 and 91. Contact 89 opens to extinguish an indicator lamp 92, and contact 90 closes to illuminate a lamp 93 thereby apprising the attendant that the press 29 is in condition for automatic operation. Closure of contact 91 further conditions the same circuit for operation of the trimmer 27 that includes the contact 81. It will be noted that the contacts 75 and 86 in Fig. 3 are included in the same circuit and it is this circuit which controls the initiation of a work cycle. Therefore, it is to be understood that a work cycle cannot be initiated if either of the presses 27 or 29 is in condition for manual operation.

The attendant will now close a switch 96 (Fig. 4) which further conditions the circuit for a press control relay 97. The relay 97 will not draw up. However, when this relay is energized, a pair of contacts 98 and 99 are drawn up to complete energizing circuits for solenoids 101 and 102 that are adapted to control the operation of the trimmer 27 and the press 29, respectively.

Next the attendant will momentarily depress a push button 103 (lower portion of Fig. 3) to complete a circuit from the bus lead 44, over lead 45, through the now depressed push button 103, through a series of contacts 104, 105, 106, 107, 108, through the now drawn up contacts 86 and 75, through a relay 111 over a lead 112, through a pair of contacts 113 and 114 to a grounded bus lead 116. Energization of the relay 111 draws up a series of contacts 117 (Fig. 3) to complete the energizing circuit for a drive motor 118. This drive motor 118 is adapted to supply power to operate the indexible magazine devices 20 and 34, and the feed mechanism 21. However, this power is not directly applied to these mechanisms but rather is applied to a clutch which as yet has not been operated. Energization of relay 111 also draws up a contact 119 to complete a bypass circuit for the push button 103.

If all the doors on the cabinets shown in Fig. 1 are closed, then a series of switches 121 are closed and a relay 122 is operated. Energization of relay 122 effectuates closure of a contact 123 contained in a work cycle start circuit. It will be appreciated that all doors must be closed before a cycle of operation for the machines can be initiated.

The attendant may now initiate a work cycle of the machines by closing a start push button 124 (Fig. 3) that functions to energize a relay 126 which draws up a contact 127 to complete a self-locking circuit. Relay 126 also draws up a contact 128 to further condition the circuit for the previously conditioned circuit running from the press control relay 97.

Relay 126 also draws up a contact 129 to complete a circuit that extends from leads 44—45, through contacts 104—108, through contacts 86 and 75, over a lead 131, through a normally closed contact 132, through a pair of contacts 133 and 134, through a normally closed contact 136, through a now closed contact 137, through the now drawn up contact 129, over a lead 138, through a high voltage push button 139, through a weld switch 141 in its upper contact position, through the now drawn up contact 123, through a door latch switch 142, through a relay 143 and through a time delay contact 144 now closed by reason of the energization of the time delay relay 52 to the bus lead 116. It may be appreciated that the relay 143 cannot be operated until the time delay relay 52 is energized which occurs after a five minute interval of energization of its operating circuit. The contacts 133 and 134 (see Fig. 1) are closed by the rams in the trimmer 27 and the press 31 being in their uppermost positions. The contacts 132 and 136 are in a closed position whenever the indexing mechanisms 20 and 34 are properly functioning as will be hereinafter more fully explained.

Energization of relay 143 permits contacts 146 and 147 to close thereby effectuating an energization of a shorting bar solenoid 148. The welder 28 utilized in the present invention employs a high voltage capacitance discharge percussion welding process for effectuating welding operations. The voltage build up for the welding operation is obtained by impressing high voltages on capacitances 151 through 156 (see Fig. 6). In order to remove any residual charge on these capacitances, during periods in which the apparatus is not being used, a pair of shorting bars 158 and 159 are provided. Now when the solenoid 148 (Fig. 3) is operated, a mechanism is actuated to open the shorting bar contacts 158—159 to thereby permit the high voltage build up on the associated capacitances.

Energization of the shorting bar solenoid 148 also effectuates the closure of a switch 161 to complete an energizing circuit through the weld switch contacts 141 to a relay 162. Immediately thereupon a pair of contacts 163 and 164 are drawn up. Closure of contact 164 permits current to flow through a variac 166 that in turn controls through a transformer 167 the application of high voltage to the plates of rectifier tubes 168 and 169 in the welding equipment shown in Fig. 6. Closure of contact 163 completes an energizing circuit for a relay 171 which may be traced from the bus leads 44 and 45 through the now closed contacts 119, 104–108, 86 and 75, over the lead 131 through the contacts 132, 133, 134, 136, 137 and 129, over the lead 138, through the contacts 139, 141, 163 and the middle and lower contacts of the weld switch 141, and through the relay 171 to the bus lead 116. Relay 171 is a mercury time delay relay and after a short interval of time will draw up a contact 172. Closure of contact 172 connects an energizing circuit from lower contact of weld switch 141, through contact 172, over a lead 173 through a relay 174, over a lead 176 to the bus lead 116. Energization of relay 174 causes a contact 177 to draw up to allow power to be applied from the high voltage transformer 43 to a variac 178. Variac 178 is connected to a high voltage transformer 179 which in turn supplies operating potentials to a pair of plates of rectifiers 180A and 180B (see Fig. 6).

Closure of contact 172 also connects the energizing current running to the relay 171, over the lead 173, over a lead 181, through a closed section of the high voltage push button 139, through a mercury-type delay relay 182 to the bus leads 116. Energization of delay relay 182 shortly draws up a contact 183 to energize a circuit for a second relay 184. Energization of relay 184 closes contacts 186 and 187 to complete an energizing circuit for a clutch solenoid 188. Operation of the clutch solenoid is followed by a release of a clutch (not shown) which permits power to be imparted from the motor 118 to the mechanism operating the magazine storage facilities 20 and 32, a timing cam shaft and the feed mechanism 21.

As the cam shaft starts to rotate, a contact 191 (Fig. 4) is closed to complete an energizing circuit for a relay 192. Relay 192 draws up a contact 193 to complete the conditioned energizing circuit for the relay 97. A contact 194 is thereupon drawn up to complete a locking circuit for the relay 97 through a pair of pressure switches 196 and 197 (see also Fig. 1). Contact 191 is shortly opened by its cam, deenergizing the relay 192 thereby releasing the contact 193. When relay 97 is energized, the contacts 98 and 99 are closed to permit the operation of the solenoids 101 and 102. The hydraulic rams of the trimmer 27 and the aligning press 31 now move down to effectuate their designated operations on the comb wires 23. The ram switches 133 and 134 (Figs. 1 and 4) are opened by the downward movement of the ram. But now a bypass or parallel circuit is provided for these contacts, through a contact 195 which is closed shortly after the cam shaft starts its rotation, and is maintained closed until the cam shaft returns to its initial position. The press rams will stay down until the pressure reaches a setting of the contacts 196 and 197, whereupon these contacts will open deenergizing the relay 97. Obviously, deenergization of the relay 97 is accompanied by an opening of the contacts 98 and 99 to release the solenoids 101 and 102 thereby permitting the press rams to return to their withdrawn position. When the rams are in the return position, the contact 191 will again close to initiate another cycle of operation of the rams.

If for some reason the rams do not return to the initial position, the contacts 133 and 134 will not close, and thus when the cam contact 195 is opened, the relays 171, 174, 182 and 184 are deenergized. Release of relay 184 causes the contacts 186 and 187 to open thereby deenergizing the clutch solenoid and thus causing all component apparatus to come to a rest.

Figure 6:
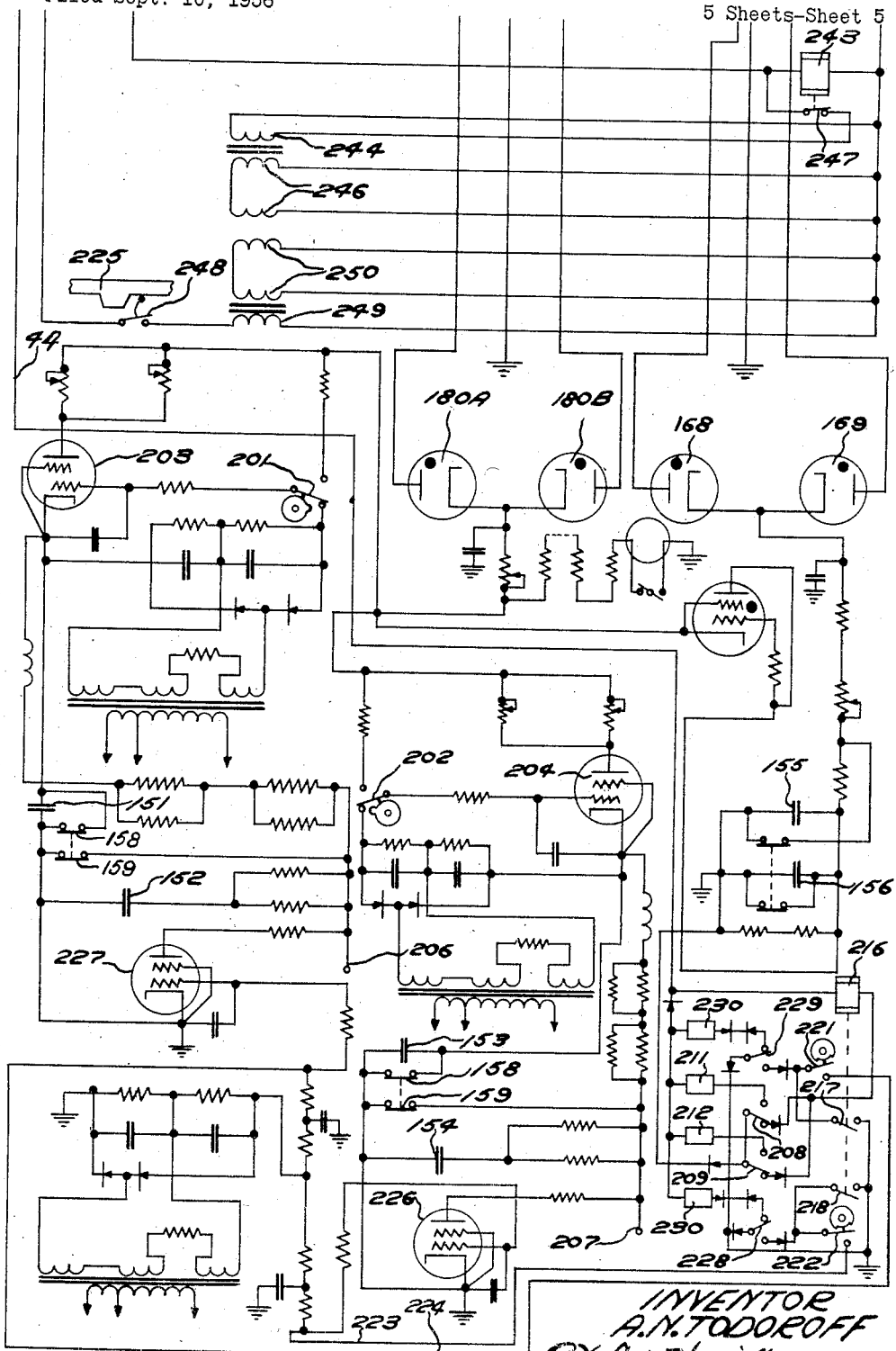

Considering now the welding circuit shown in Fig. 6, the rotation of the cam shaft cyclically closes a pair of contacts 201 and 202 to render a pair of tubes 203 and 204 conductive. Conduction of tube 203 is followed by a charging of the associated condensers 151 and 152. In a like manner conduction of tube 204 is followed by a charging of the condensers 153 and 154. When the tubes 203 and 204 are cut off, the associated condensers will supply high voltage to a pair of welding guns 206 and 207 whereupon welding operations will be performed. The operation of the welding guns and the mode of feeding parts to be welded thereto is more fully described in the aforeidentified Larsen Patent 2,749,419.

If piece parts are properly positioned to be welded, then a pair of contacts 208 and 209 (see Figs. 1 and 6) are in a closed position, and a pair of indicator lights 211 and 212 will be operated. However, if the piece parts are not properly positioned then movement of either contacts 208 or 209 ensues to the position shown in Fig. 6, and a relay 216 will be energized. A pair of contacts 217 and 218 are drawn up, and when a pair of cyclically operable cam controlled contacts 221 and 222 are closed, ground potential is impressed over a pair of leads 223 and 224 to effectuate the operation of a pair of electronic tubes 226 and 227, respectively. Operation of these tubes completes an obvious shunting circuit for the high voltage circuit running to the welding guns 206 and 207.

If the welding machines do not feed contact elements into position to be welded on the wires 23 then either of a pair of contacts 228 or 229 are moved to a lower closed position, extinguishing lights 230, whereupon ground potential will pass to either the closed contact 228 or 229. The cam operated contacts 221 and 222 will again close to operate the tubes 226 and 227 to short circuit the welding guns 206 and 207. If the piece part (comb 22) is properly positioned and a contact element is available to be welded thereto, then the safety circuits will not operate the tubes 226 and 227 and a welding operation will be completed by discharging the welding voltage to the guns 206 and 207 and through the contact element and wire springs 23 to ground.

Following each welding operation, the cam for actuating the transfer mechanism 21 causes a transfer bar 225 (Figs. 1 and 5) to move toward the left; and as a result, a switch 231 opens and a switch 232 closes to energize a time delay relay 233 through a closed contact 234. Following closure of switch 232 and prior to the operation of relay 233, the opening of switch 231 deenergizing solenoid 241, permits an energizing circuit for a transformer 236 to be rendered effective to operate a solenoid 237 that functions to operate a lefthand magazine feed mechanism 240 to raise a lefthand magazine 35 to permit the transfer bar to pick up a comb 22. Relay 233 times out and opens a contact 238 to deenergize the transformer 236, and thus release the solenoid 237. The transfer bar will now be actuated by its cam to move toward the right causing the switch 231 to close. Energization of a transformer 239 follows and a solenoid 241 is operated to reset the lefthand magazine feed mechanism 240 of the lefthand indexing device 20.

When the transfer mechanism 21 advances the fabricated combs towards the right, a switch 242 (Fig. 5) is closed by transfer bar 225 to complete an energizing circuit for a time delay relay 243. As soon as the switch 242 is closed, a transformer 244 is energized to effectuate the operation of a solenoid 246. Operation of solenoid 246 conditions the feed mechanism 245 for the magazine 35 of the righthand indexing device. After a short delay the relay 243 is operated to open a contact 247 to deenergize the transformer 244 and the solenoid 246. As the transfer mechanism further advances the transfer bar 225 toward the right a second switch 248 is operated to complete an obvious circuit for a transformer 249. This action is followed by an energization of a solenoid 250 which functions to raise a righthand magazine rack 35 into position so that a slot formed therein is in register with the fabricated comb delivered thereto by the feed mechanism 21.

As the start contact 191 (Fig. 4) for the presses is closed by its timing cam, the relay 192 is energized. Energization of this relay not only closes the contact 193 in the control circuit for the presses but also closes a contact 251. If the last comb 22 has been removed from the magazine 35 of the lefthand indexing device 20, the magazine actuates a mechanism to close a contact 252 thereby completing an energizing circuit for a relay 253. Energized relay 253 closes contacts 254, 256 and 257 and is also effective to open a contact 258. When contact 256 closes there is completed an energizing circuit for a solenoid 259 that functions to withdraw a holding pin from a turntable 260 associated with the lefthand indexing device 20. Withdrawal of the holding pin effectuates the opening of an interlocked switch including a contact 261 and a contact 262. Contact 261 moves into engagement with its upper contact to complete an energizing circuit for a solenoid 263. This solenoid is effective to rotate the turntable to position another magazine 35 of the indexing device 20 in register with the feed mechanism 21.

When the contact 262 opened, a relay 266 was deenergized to release a contact 267 to complete an energizing circuit through now closed contact 254 for a relay 268. Energization of this relay completes a holding circuit through a contact 269. Energized relay 268 is also effective to open the control circuit contact 132 thereby preventing a cyclic operation of the machines while the indexible device 20 is moving.

Presence of a loaded magazine in the feed position effectuates an opening of the contact 252 thereby deenergizing the relay 253 which effectuates a closure of the contact 258 and an opening of the contacts 254, 256 and 257. When the feed mechanism 21 advances the transfer bar 225, a switch 271 is closed thus permitting a solenoid 272 to assume an energized condition. This solenoid functions to return the turntable holding pin to its original position. Restoration of the holding pin is followed by a return of the contact 261 to its lower contact position to energize a solenoid 273 which functions to place the turntable advance mechanism in its initial position.

Contact 262 is restored by the turntable advance mechanism to its initial position and the relay 266 is again energized to open contact 267 to deenergize the relay 268. Contact 269 opens and contact 132 (Fig. 4) closes to again operate the relays controlling the operation of the presses and the system is again in condition for further cyclic operations.

Consideration will now be given to the operation of the righthand indexing mechanism 34 when the last slot in a magazine 35 has a fabricated comb 22 inserted therein. As the transfer mechanism 21 moves the transfer bar 225 to the right to advance a comb 22 into the last slot, the switch 248 (Fig. 6) is momentarily closed to energize the transformer 249 and the solenoid 250. Solenoid 250 thereupon raises the magazine 35 to position the last slot to receive the fabricated comb. Further advance of the transfer mechanism 21 and bar 225 effectuates a closure of the switch 242 thereby causing an energization of the time delay relay 243. Before relay 243 operates, an energizing circuit through contact 247 is completed to supply current to the transformer 244 which operates the solenoid 246 to reposition the magazine raising mechanism. When relay 243 does operate, the contact 247 is opened to deenergize the transformer 244 and the solenoid 246.

Figure 4:
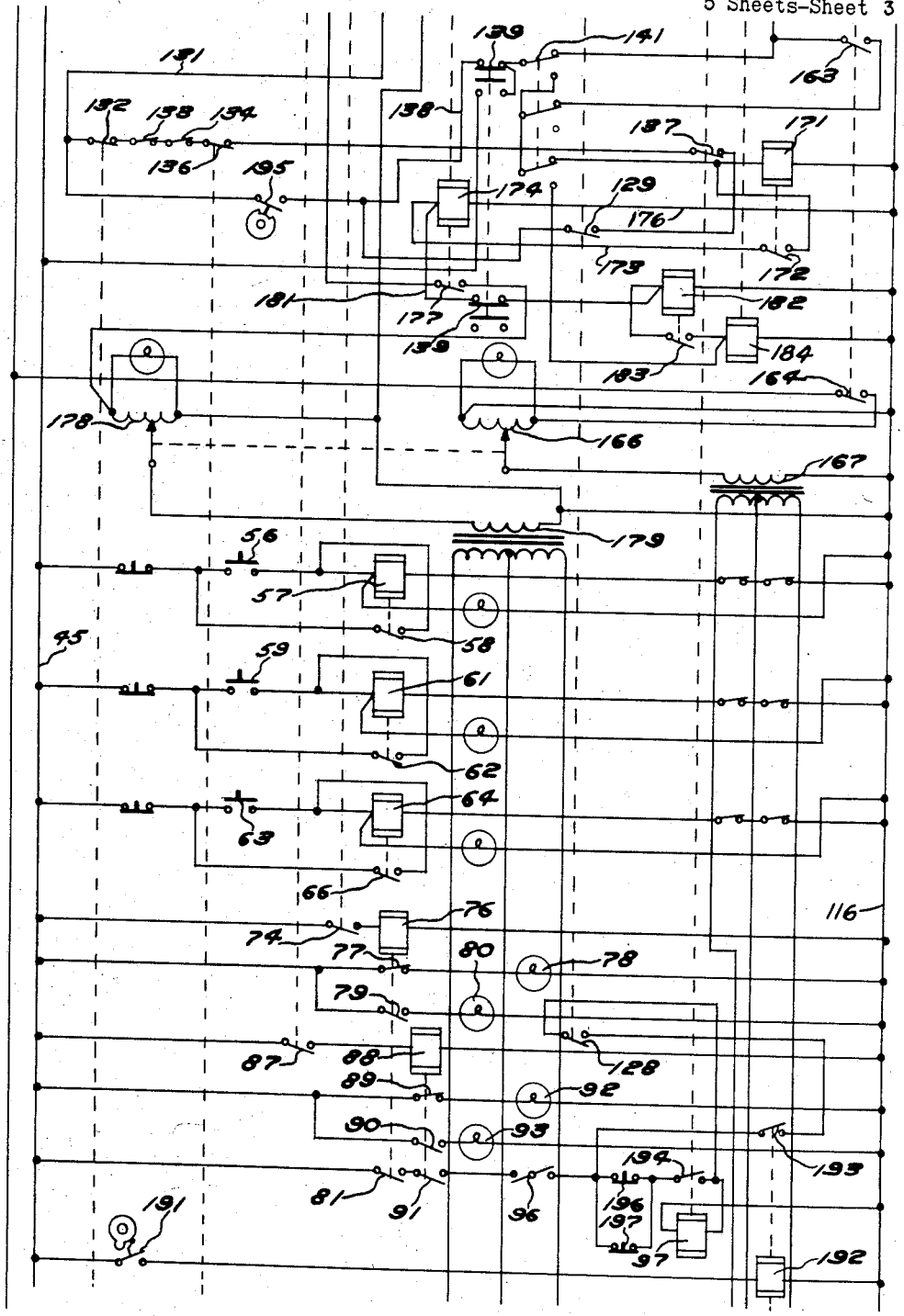
Figure 5:
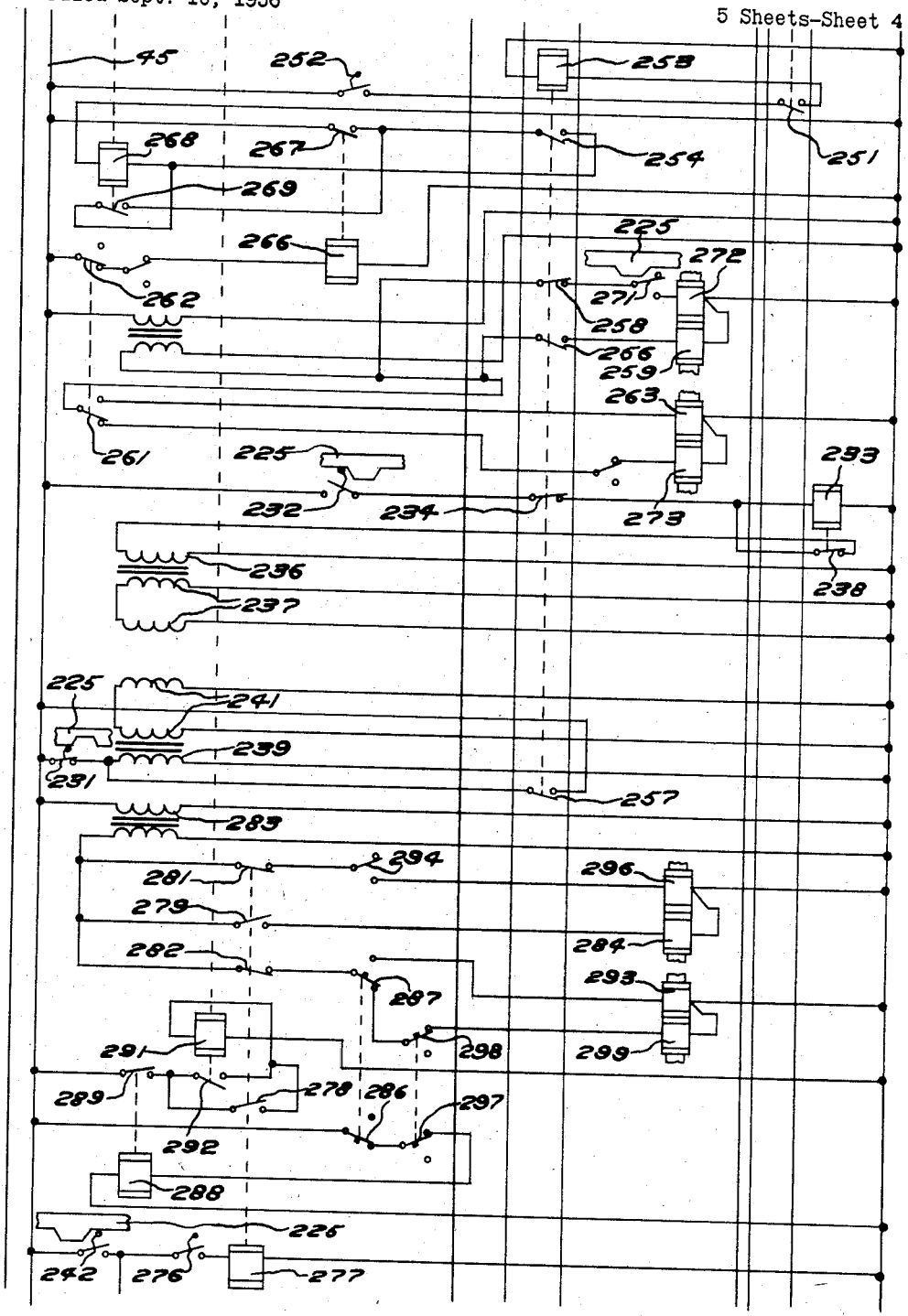

The advance of the magazine rack to a position indicative of a fully loaded condition causes a magazine switch 276 to close and energize a relay 277 that thereupon functions to close contacts 278 and 279 and open contacts 281 and 282. A permanently energized transformer 283 supplies power to operate a solenoid 284 upon closure of the contact 279. This solenoid will actuate a holding pin device associated with a turntable 285 of the righthand indexing device 34. Withdrawal of the holding pin, functions to open a switch 286 and move a contact 287 into engagement with an upper stationary contact. Opening of switch 286 results in a deenergization of a relay 288 thereby permitting a contact 289 to close and complete an energizing circuit through the now closed contact 278 to a relay 291. Operation of relay 291 effectuates completion of a locking circuit through a contact 292. Also, energization of relay 291 opens the contact 136 (Fig. 4). It will be recalled that contact 136 is included in the energizing circuits of the relays shown in Fig. 4 for controlling the cyclic operation of the trimmer 27 and the aligning press 29; hence, further cyclic operation of the system is precluded during movement of the indexing device 34.

Following insertion of the comb in the last slot, the transfer mechanism 21 moves back toward the left to open the switch 242 thereby effectuating a deenergizing of the relay 277. Contacts 278 and 279 will thereupon open and the contacts 281 and 282 will be restored to the closed position. Inasmuch as the contact 287 is now engaged with its upper stationary contact, an energizing circuit from the transformer 283 will be completed for a solenoid 293. Solenoid 293 is adapted to actuate the mechanism for advancing the turntable 285 of the indexing device 34 through one increment to present an empty magazine rack in position to receive the combs 22 from the transfer mechanism 21.

As the turntable advances, a contact 294 is closed to effectuate energization of a solenoid 296 that functions to restore the holding pin for the turntable 285. Restoration of the holding pin is effective to again close the switch 286 and move the contact 287 into engagement with its lower stationary contact. As the new magazine is moved into position, interlocked contacts 297 and 298 are also closed. Closure of contact 297 completes the energizing circuit to the relay 288 which is effective to open a contact 289 and therefore release the relay 291. Deenergization of relay 291 opens contact 292 to release its locking circuit, and the contact 136 is also released to again permit energizing current to flow to the relays controlling the cyclic operation of the machines comprising the system. Closure of contact 298 is effected to energize a solenoid 299 which is effected to restore the righthand turntable advancing mechanism to an initial position.

If for some reason the turntables 260 and 285 do not properly function, then the contacts 132 and 136 will not be closed and as a result further functioning of the machines will be precluded. This action is manifest since contacts 132 and 136 are included in or control the energizing circuits of the relays 143, 162, 171, 174 and 182.

It will be noted that there is associated with the transfer mechanism an overload switch device 301. If the transfer mechanism becomes jammed, then the switch 301 (Fig. 1) will operate to open the contact 105 (Fig. 3) and energizing current will be precluded from reaching the control relays. Contacts 106, 107 and 108 are provided at various locations on the fabricating machines to provide for emergency stops of the machines.

In order to operate this system without operating the welding equipment, the switch 141 (Fig. 4) is moved into engagement with its lower contacts thereby interrupting the energizing circuits for the relays 162 and 174. It is to be recalled that these relays control the application of the high voltage to the welding equipment. Consequently, the welding equipment will not function. However, the operating circuits to the other relays are not disturbed and as a result, the trimmer 27 and the aligning press 29 will operate in the same manner as previously described.

When it is desired to operate the welder and not the trimmer and aligning presses, the switch 96 (lower portion of Fig. 4) is opened thereby precluding the operation of the relay 97 which controls the operation of the press solenoids 101 and 102. The welding device 28 which is not affected by the deenergization of the relay 97 will continue to perform its normal function and the parts will be fed through the system and only operations performed thereon will be the welding of the contact elements to the wires 23.

It is to be understood that the above-described arrangements of apparatus and circuits and construction of circuit components are simply illustrative of an application of the principles of the invention and many other modifications may be made without departing from the invention.

What is claimed is:

1. In a system for controlling the cyclic operation of a series of fabricating machines, means for advancing parts to the fabricating machines, a first storage means for the unfabricated parts, a second storage means for the fabricated parts, means for indexing said first storage means to present parts to the advancing means, means for indexing said second storage means to receive the fabricated parts, an electrical control circuit for sequentially and cyclically operating the advancing means and the fabricating machines, a first multi-contact circuit means having first contacts connected to the fabricating machines and second contacts connected to said indexing means for applying power to said electrical control circuit, a second circuit having a contactor therein for applying power to said electrical control circuit, means actuated by the fabricating machines in an initial position for completing said first multi-contact circuit, means for closing said contactor in said second circuit while the fabricating machines are operating, relay means operated by the failure of the indexing means to index for opening said second contacts, and means on said fabricating machines operated by failure of the fabricating machines to cyclically operate for opening the first contacts.

2. A system for automatically controlling a series of fabricating machines including a start circuit comprising a first time delay relay, a conditioning circuit for said fabricating machines, a contact actuated by sad first time delay relay for operating said conditioning circuit, a second time delay relay operated by the operation of said conditioning circuit for controlling the operaton of a group of the fabricating machines, and a third time delay relay operated by the second time delay relay for controlling the operation of the remainder of the fabricating machines.

3. A system for automatically controlling a series of fabricating machines having a start control circuit comprising a time delay relay, a conditioning circuit for said fabricating machines, a contact controlled by said time delay relay and included in said conditioning circuit, an electronic control circuit for one of said fabriating machines, an unoperated energizing circuit for said electronic control circuit, and a second time delay circuit actuated by the operation of the conditioning circuit for operating said energizing circuit.

4. In an electrical circuit system for controlling the cyclic operation of a series of fabricating machines one of which is a welding machine, a capacitance discharge circuit for said welding machine, means for shorting the capacitance discharge circuit, a solenoid for removing said shorting means, a conditioning circuit for said welding machine, a time delay device actuated by said conditioning circuit, means actuated by the time delay device for energizing said solenoid, a start control circuit for the remainder of the fabricating machines, and means actuated by the energization of the solenoid for conditioning said start circuit for operation.

5. An electrical control system for controlling a feed mechanism to advance articles from an indexible supply device through a series of fabricating machines to an indexible receiving device which comprises a first relay circuit having a normally open first contact therein for operating the fabricating machines, a cam for closing said first contact, a solenoid for initiating operation of said cam and said feed mechanism, a start circuit having normally closed second contacts therein for energizing said solenoid, said second contacts in engagement with said fabricating machines so as to be opened by the operation of the fabricating machines, third normally closed contacts in said first relay circuit opened by the fabricating machines to restore the fabricating machines to the initial position and reclose said second contacts, a second relay circuit having a fourth normally open contact for operating the indexible supply means, a third relay circuit having a fifth normally open contact therein for operating the indexible receiving device, and means on the feed mechanism for closing said fourth and fifth contacts.

6. An electrical control circuit for controlling a feed mechanism to advance articles from a rotatable storage device through a series of fabricating machines which comprises a first relay circuit having a first normally open contact therein for initiating operation of said fabricating machines, a cam means for closing said first contact, a solenoid for initiating operation of said cam means and said feed mechanism, a start circuit having a series of second normally closed contacts therein for energizing said solenoid, certain of said contacts being held closed by the fabricating machines in the initial positions, a normally open bypass circuit connected around the contacts in the start circuit, a cam operated by the solenoid for closing said bypass circuit when the fabricating machines move from the initial positions, a second control circuit for operating the rotatable storage device, a normally open contact in said second control circuit operated by said first relay circuit, and a relay included in said second control circuit for opening a contact in said start circuit.

7. An electrical control system for controlling a feed mechanism to advance articles from a rotatable storage device through a series of fabricating machines to a rotatable receiving device which comprises a first relay circuit having a first normally opened contact therein for initiating operation of said fabricating machines, a cam means for closing said first contact, a solenoid for initiating operation of said cam means and said feed mechanism, a start circuit having a series of second normally closed contacts therein for energizing said solenoid, certain of said second start circuit contacts being held closed by the fabricating machines in the initial positions, a normally open bypass circuit connected around the contacts in the start circuit, a cam operated by said solenoid for closing said bypass circuit when the fabricating machines move from the initial positions, a second control circuit for operating the rotatable storage device, a normally open contact in said second control circuit operated by said first relay circuit, a relay included in said second control circuit for opening a contact in said start circuit, a third control circuit for operating the rotatable receiving device, a normally opened contact in said third control circuit operated by said first relay circuit, and a relay included in said third control circuit for opening another of said contacts in said start circuit.

8. An electrical control system for controlling a feed mechanism to advance articles from a supply device through a fabricating machine, said supply device including a plurality of indexible magazines mounted on a turntable, the combination therewith of a first relay circuit having a first normally open contact therein for initiating operating of said fabricating machine, a cam means for closing said first contact, a solenoid for initiating operation of said cam means and said feed mechanism, a start circuit having a pair of normally closed contacts therein for energizing said solenoid, a first of said pair of contacts being held closed by said fabricating machine in the initial position, a normally open bypass circuit connected around said pair of contacts in the start circuit, a cam operated by the solenoid for closing said bypass circuit when the fabricating machine moves from the initial position, a second control circuit means for indexing one of said magazines, a second normally opened contact in said second control circuit, means on the feed mechanism for closing said second contact, a third normally open control circuit adapted to rotate said turntable, means operated by a predetermined number of operations of the second control circuit to index the magazine for closing said third control circuit, and a relay included in said third control circuit for opening the second contact of said pair in said start circuit.

9. An electrical control circuit for a fabricating system having indexible article storage and receiving mechanisms and article fabricating mechanisms comprising individual circuits for controlling the operation of each of the storage, receiving and fabricating mechanisms; starting means including a portion of each individual circuit for cyclically energizing each circuit; a conditioning circuit having a normally open contact and normally closed contacts and connected to each individual circuit to prepare each circuit for operation; a time delay relay for closing the normally open contact to actuate the starting means; and means within each individual circuit and operated by failure of an individual circuit for opening the normally closed contact to deactuate the starting means.

10. An electrical circuit for controlling the operation of a fabricating system having an article feed mechanism for advancing articles from an indexible supply device through a first forming machine, a welding machine, a second forming machine and to an indexible article receiving device comprising a starting means for cyclically operating the feed mechanism and the indexible devices; a first circuit having a first normally open contact and normally closed contacts for preparing the welding machine for operation and operating the starting means; a time delay relay for closing said first normally open contact to energize said first circuit; a second circuit having a second normally open contact for operating the first and second forming machines; a third circuit having a third normally opened contact for operating the welding machine; camming means operated by said starting means for closing said second and third normally open contacts to energize said second and third circuits; and means operated by a failure of an indexible device or a forming machine to open one of the normally closed contacts to deenergize the first circuit.

References Cited in the file of this patent

UNITED STATES PATENTS

| 1,433,328 | Wright | Oct. 24, 1922 |
| 2,114,284 | Barnes et al. | Apr. 19, 1938 |
| 2,251,948 | Oberhoffken et al. | Aug. 12, 1941 |
| 2,340,448 | Andren | Feb. 1, 1944 |
| 2,429,938 | Mansfield | Oct. 28, 1947 |
| 2,637,798 | Burge et al. | May 5, 1953 |
| 2,656,911 | Boyce et al. | Oct. 27, 1953 |

UNITED STATES PATENT OFFICE
CERTIFICATE OF CORRECTION

Patent No. 2,883,514                                      April 21, 1959

Alexander N. Todoroff

It is hereby certified that error appears in the printed specification of the above numbered patent requiring correction and that the said Letters Patent should read as corrected below.

Column 11, line 18, for "a air of" read — a pair of —.

Signed and sealed this 8th day of September 1959.

(SEAL)
Attest:

KARL H. AXLINE                                      ROBERT C. WATSON
Attesting Officer                                     Commissioner of Patents